US012401839B2

(12) United States Patent
Vincent

(10) Patent No.: US 12,401,839 B2
(45) Date of Patent: Aug. 26, 2025

(54) METHODS AND DEVICES FOR INSERTING AN EVENT INTO A TRANSPORT FLOW, FOR MONITORING, MANAGING AND RECEIVING THE TRANSPORT FLOW, AND COMPUTER PROGRAM ALL CORRESPONDING THERETO

(71) Applicants: ENENSYS TECHNOLOGIES, Cesson-Sevigne (FR); TDF, Montrouge (FR)

(72) Inventor: David Vincent, Amanlis (FR)

(73) Assignees: ENENSYS TECHNOLOGIES, Cesson-Sevigne (FR); TDF, Montrouge (FR)

( * ) Notice: Subject to any disclaimer, the term of this patent is extended or adjusted under 35 U.S.C. 154(b) by 197 days.

(21) Appl. No.: 18/554,478

(22) PCT Filed: Apr. 7, 2022

(86) PCT No.: PCT/EP2022/059243
§ 371 (c)(1),
(2) Date: Oct. 9, 2023

(87) PCT Pub. No.: WO2022/214586
PCT Pub. Date: Oct. 13, 2022

(65) Prior Publication Data
US 2024/0205472 A1    Jun. 20, 2024

(30) Foreign Application Priority Data
Apr. 9, 2021    (FR) .................................. FR2103688

(51) Int. Cl.
*H04N 21/236*    (2011.01)
*H04N 21/242*    (2011.01)
(Continued)

(52) U.S. Cl.
CPC ..... *H04N 21/23608* (2013.01); *H04N 21/242* (2013.01); *H04N 21/2625* (2013.01); *H04N 21/43074* (2020.08)

(58) Field of Classification Search
CPC ....... H04N 21/23608; H04N 21/43074; H04N 21/242; H04N 21/2625
See application file for complete search history.

(56) References Cited

U.S. PATENT DOCUMENTS

2019/0141406 A1    5/2019    Casagrande et al.

FOREIGN PATENT DOCUMENTS

EP          2533547 A1         12/2012
WO    WO-2019011655 A1 *   1/2019    ......... H04N 21/4331

OTHER PUBLICATIONS

"HbbTV 2.0.3 Specification", HbbTV Association, published on archive.org at https://web.archive.org/web/20201124003757/https://www.hbbtv.org/wp-content/uploads/2020/10/HbbTV-SPEC-00525-HbbTV-SPEC-00515-008-hbbtv203_2020_10_14.pdf (Year: 2020).*

(Continued)

*Primary Examiner* — Nicholas T Corbo
(74) *Attorney, Agent, or Firm* — S.J. Intellectual Property LTD.

(57) ABSTRACT

Methods and devices for inserting an event into a transport flow, for monitoring, managing and receiving the transport flow, and computer program all corresponding thereto. The invention relates to a method for monitoring a transport flow at the output of an equipment of a broadcast network, implementing at least one iteration of the following steps: —obtaining (61) the transport flow delivered by said equipment, —detecting (62) a current event packet associated with content carried by said transport flow, said event packet carrying a synchronization header comprising: —reference time information defined with respect to a reference clock of (Continued)

said content; —a desired delay between said current event packet and a reference packet of said content identified based on said reference time information, —determining (63) an offset between an actual position of said current event packet in said transport flow and a desired position of said current event packet in said transport flow, determined based on said reference time information and on said desired delay, called processing offset.

20 Claims, 4 Drawing Sheets

(51) Int. Cl.
*H04N 21/262* (2011.01)
*H04N 21/43* (2011.01)

(56) References Cited

OTHER PUBLICATIONS

"Media Source Extensions", World Wide Web Consortium (W3C), published on archive.org at https://web.archive.org/web/20161119024811/https://www.w3.org/TR/2016/REC-media-source-20161117/ (Year: 2016).*

A Guide to MPEG Fundamentals and Protocol Analysis, Mar. 1, 2007 (Mar. 1, 2007), p. 1-101, 20070301 Retrieved from the Internet: URL:http://www.tek.com/products/video_test/mpeg_monitors.html XP002505551; [retrieved on Nov. 25, 2008]; p. 74-p. 75; p. 78 and p. 90.

ATSC Organization, "A/93—Synchronized/Asynchronous Trigger", Apr. 1, 2002 (Apr. 1, 2002), ATSC, Advanced Television Systems Committee, 1776 K Street N.W., Washington, D.C. 20006, USA Retrieved from the Internet: URL:https://www.atsc.org/wp-content/uploads/2021/04/A93-2002.pdf XP017861351.

* cited by examiner

METHODS AND DEVICES FOR INSERTING AN EVENT INTO A TRANSPORT FLOW, FOR MONITORING, MANAGING AND RECEIVING THE TRANSPORT FLOW, AND COMPUTER PROGRAM ALL CORRESPONDING THERETO

1. FIELD OF THE INVENTION

The field of the invention is that of broadcasting information, in particular television services, in a broadcast network.

More specifically, the invention relates to the broadcasting of events, allowing to trigger actions related to content broadcast in the broadcast network, for example video content.

In particular, the invention proposes a solution allowing to improve the synchronisation of an event with the content to which it relates, in particular at a receiver.

The invention applies in particular, but not exclusively, to the broadcasting of a transport stream according to the DVB-T or DVB-T2 ("Digital Video Broadcasting-Terrestrial"), DVB-S or DVB-S2 ("Digital Video Broadcasting-Satellite"), or DVB-C ("Digital Video Broadcasting-Cable") standards.

2. PRIOR ART

Today there are solutions that allow to benefit from services that are interactive with the programs of the television channels.

In particular, it is possible to transmit, in a transport stream carrying one or more contents, information related to one or more application (s) intended to be executed by a receiver, in particular allowing the receiver to benefit from additional content.

2.1 Events

Such information comprises in particular events, allowing to trigger actions related to these applications.

These events can be used to allow synchronisation between interactive data and the video and/or audio components of transport stream content, for example to synchronise the display of graphic elements in addition to a video (for example a "pop-up"), replacing an advertisement with targeted advertising, inserting a subtitle or replacing it with another, etc.

These events are for example of the "Stream Event" or SE type, in the DSM-CC (for "Digital Storage Media Command and Control") format, as defined in the standard ISO/IEC 13818-6: "Information technology—Generic coding of moving pictures and associated audio information—Part 6: Extensions for DSM-CC".)

These events can be received by receivers compatible with HbbTV (Hybrid Broadcast Broadband TV) standards, also called hybrid or connected receivers, which represent the vast majority of connectable televisions on the market today.

Thus, HbbTV standard, as defined in the technical specification ETSI TS 102 796 V1.4.1, describes the signalling, transport and signalling of such interactive applications intended to be executed by a hybrid receiver, and in particular of events associated with such applications. Examples of applications are presented in particular in the technical specification ETSI TS 102 809 (V1.3.1): "Digital Video broadcasting (DVB); Signalling and carriage of interactive applications and services in Hybrid Broadcast/Broadband environments".

2.2 Insertion of an Event into a Transport Stream

The insertion of an event into a transport stream, for example an MPEG-TS (for "Moving Picture Experts Group-Transport stream") stream, is described below.

Conventionally, a first encoder of a headend receives source data as input and delivers a first MPEG-TS stream as output. A second encoder receives other source data as input and delivers a second MPEG-TS stream as output. Such encoders can also receive commands in SCTE 104 format and convert them into SCTE 35 format.

Each "elementary" MPEG-TS stream (that is to say coming from an encoder) is composed of a set of transport packets (TS), comprising audio, video and/or subtitle packets, etc. These different packets carry time information defined with respect to a reference clock associated with the "elementary" MPEG-TS stream, for example a PCR ("program clock reference") or TEMI ("Timed External Media Information") clock signal. For example, a video packet carries a PTS ("Presentation Time Stamp") and/or DTS ("Decoding Time Stamp") value corresponding to a time of presentation and/or decoding of a picture coded in this video packet, with respect to the reference clock associated with the "elementary" MPEG-TS stream.

The "elementary" MPEG-TS streams obtained at the output of the various coders can be multiplexed by a multiplexer of the headend. At the output of the multiplexer, a "global" MPEG-TS stream encapsulating several "elementary" MPEG-TS streams, wherein all the TS packets are mixed, is therefore obtained.

In particular, at least one event can be defined in relation to an "elementary" MPEG-TS stream (for example an off-hook order, a graphic element to be added to a picture of the content carried by the "elementary" MPEG-TS stream, etc.). Such an event, for example an event in SCTE 35 format obtained at the output of the encoder, can in particular be converted into a "Stream Event", as described in patent application WO2019/011655. In particular, this patent application proposes using the time information obtained from an SCTE 35 type command, for example, to position an event in a transport stream and establish a fine synchronisation between the event and a reference point of the "elementary" MPEG-TS stream.

Such an event can be inserted in the form of an event packet into the MPEG-TS stream, in a relative manner with respect to a reference packet of the "elementary" MPEG-TS stream. Such an event packet is therefore a TS packet.

FIG. 1 illustrates an example of MPEG-TS stream 11 received by a receiver. The TS packets 111, 112, and 113 are for example payload packets of an "elementary" MPEG-TS stream. The event packet 110 may carry an event relating to the "elementary" MPEG-TS stream. For example, the event packet is a TS packet carrying a Stream Event in the DSM-CC format defining one or more actions related to the content carried by the "elementary" MPEG-TS stream.

Conventionally, an "insertion pre-roll" is defined for an event, corresponding to a desired delay between the insertion of the command and a point in the elementary MPEG-TS stream signalled by the event. This positioning in advance allows the receivers to prepare the actions to be carried out when receiving the event. An early reception implies that the insertion pre-roll value is known by the receiver.

According to the example illustrated in FIG. 1, such an insertion pre-roll 12 corresponds to a desired delay, conventionally expressed in milliseconds, between the position of the event packet 110 in the MPEG-TS stream and the position of a reference packet 111 of the "elementary" MPEG-TS stream in the MPEG-TS stream. For example, the desired position for inserting the event packet 110 into the MPEG-TS stream can be of the order of 100 ms before the reference packet 100 corresponding to the first packet of a target picture identified by its PTS value, based on the reference clock serving as a reference for the PTS used.

However, it can be seen in FIG. 1 that there is an offset 13 between the actual position of the event packet 110 in the MPEG-TS stream (which corresponds for example to the time of reception, by the receiver of the MPEG-TS stream 11, of the first byte of the event packet 110) and the desired position of the event packet 110 relative to the reference packet 111 (referenced 114).

Such an insertion offset therefore corresponds to an undesired offset between the target and actual insertion positions of the event packet into the MPEG-TS stream.

This offset can be caused by operations carried out on the MPEG-TS stream:
insertion of the "stream event",
multiplexing, transcoding, re-multiplexing (which can modify the scheduling of TS packets),
use of an error correcting code (FEC or "Forward Error Correction") in an equipment,
etc.

In particular, the structure of the broadcast network and/or the nature of the equipment traversed by the MPEG-TS stream may introduce an offset between the HbbTV components (for example of the Stream Event type) and video (or audio, subtitle, etc.) of an MPEG-TS stream. For example, a transcoder may introduce a lag of several seconds. Similarly, using an error-correcting code can add a latency of hundreds of milliseconds.

In particular, such an offset can change if the broadcast network is modified over time.

Moreover, such an offset may be different from one sub-network to another. For example, for the same content broadcast in DTT and satellite, the delay may be different for the two broadcast modes, since they do not use the same network structure and do not use the same equipment.

Moreover, an additional delay can also be introduced by the receiver between the display of a reference picture and the reception of the event defined from this reference picture at the HbbTV application. This offset may vary from one receiver model to another.

A disadvantage related to this or these offsets is the desynchronisation between the event and the "elementary" MPEG-TS stream to which it relates, at a receiver.

Indeed, the PTS/DTS and SCTE commands are not accessible by an HbbTV application. Events according to the HbbTV standard therefore do not carry a time reference, such as a presentation instant (PTS) or a decoding instant (DTS), which would allow fine synchronisation, at the receivers, of the event (or more generally of the HbbTV component) with a video (or audio, subtitle, etc.) component of the "elementary" MPEG-TS stream to which it relates. In other words, a receiver has no information between the event and the component of the "elementary" MPEG-TS stream with which it is associated.

Even if an event was inserted into the MPEG-TS stream to ensure synchronisation between the event and the component to which it relates, as described in patent application WO2019/011655 for example, the synchronisation may be altered by the offset (s) introduced by the broadcast network or the receiver.

There is therefore a need for a new technique allowing to improve the synchronisation between an event and the component of the transport stream to which it relates, at a receiver.

3. DISCLOSURE OF THE INVENTION

The invention proposes, in at least one embodiment, a solution not having all the disadvantages of the prior art, in the form of a method for monitoring a transport stream at the output of an equipment of a broadcast network. For example, such equipment, called equipment to be monitored, can be a multiplexer, a gateway, a transcoder, etc.

According to the invention, such a method implements at least one iteration of the following steps:
obtaining the transport stream delivered by said equipment,
detecting a current event packet associated with content carried by the transport stream, the event packet carrying a synchronisation header comprising:
reference time information defined with respect to a reference clock of said content;
a desired delay between said current event packet and a reference packet of said content identified based on said reference time information,
determining an offset between an actual position of said current event packet in said transport stream, and a desired position of said current event packet in said transport stream, determined based on reference time information and on said desired delay, called processing offset.

The proposed solution thus allows to measure, during the broadcast of the transport stream in the broadcast network, an offset introduced by at least one item of equipment of the broadcast network, for example a multiplexer, a broadcast gateway, a transcoder, etc. It is thus possible to compensate for this offset before continuing to broadcast the transport stream in the network or to inform the other equipment of the broadcast network. It is also possible to take this offset into account when inserting subsequent event packets into the transport stream.

In particular, the equipment to be monitored can be equipment placed at the end of the broadcast network (for example a broadcast gateway), so as to determine the offset introduced by the whole of the broadcast network.

For this purpose, at least one current event packet carrying specific information is detected in the transport stream at the output of the equipment to be monitored. Thanks to this specific information, it is possible to determine a desired, or theoretical, position of the current event packet in the transport stream with respect to a reference point of the content. It is also possible to measure the actual position of the current event packet in the transport stream at the output of the equipment to be monitored with respect to this reference point, and to determine an offset between the actual position of the current packet and its desired position in the transport stream. This offset, introduced in particular by the processing of the transport stream up to the equipment to be monitored, is hereinafter called "processing offset".

Knowing this processing offset, different actions can be performed.

For example, this processing offset can be:
stored in a memory of the monitoring device, transmitted to at least one other equipment of the broadcast network (event insertion device, service platform storing the different offset values, etc.), directly or by modifying a field of the synchronisation header of the current event packet, used to correct the position of the current event packet in the transport stream, so that the desired position of the current event packet and its actual position coincide;

used to insert at least one subsequent event packet into the transport stream, at a position such that the desired position of the subsequent event packet and its actual position coincide, etc.

In this way, it is possible to improve the synchronisation between an event packet and the reference point of the content to which it relates, in particular at a receiver receiving the data stream.

Such steps can in particular be implemented in a device for monitoring a transport stream. The invention therefore also relates to a corresponding monitoring device.

Such a monitoring device, also called SE monitoring, is in particular suitable for implementing the monitoring method described above. It could of course include the different features relating to the monitoring method according to the embodiment of the invention, which can be combined or taken separately. For example, such a device can be integrated with an event insertion device, with a gateway or with any other equipment of the broadcast network.

The invention also relates to a method for inserting an event into a transport stream intended to be broadcast in a broadcast network.

According to the invention, such a method implements the following steps:

obtaining said transport stream, inserting, in said transport stream, at least one current event packet associated with content carried by said transport stream, said current event packet carrying a synchronisation header comprising:

reference time information defined with respect to a reference clock of said content;

a desired delay between said current event packet and a reference packet of said content identified based on said reference time information, said current event packet being inserted into said transport stream at a position defined from the position of said reference packet and said desired delay.

The proposed solution thus allows to insert, into the transport stream, particular event packets, which can be used to measure an offset introduced by the broadcast network.

In particular, an event packet according to the invention carries reference time information defined with respect to a reference clock of the content, for example a PTS value associated with a reference picture of the content defined with respect to a clock signal embedded in the content (a PCR, a TEMI, etc.). Such an event packet also carries a desired delay between the current event packet and a reference packet of the content identified based on the reference time information, for example the packet carrying the reference picture. Such a desired delay corresponds for example to an insertion pre-roll.

Thanks to this specific information, it is possible to determine a desired, or theoretical, position of the current packet in the transport stream with respect to a reference point of the content. It is also possible to measure the actual position of the current packet in the transport stream with respect to this reference point, at the output of a broadcast network equipment, and to determine the processing offset between the actual position of the current packet and its desired position in the transport stream.

Such steps can in particular be implemented in a device for inserting an event into a transport stream. The invention therefore also relates to a device for inserting a corresponding event.

Such a device for inserting an event into a transport stream, also called SE inserter, is in particular suitable for implementing the method for inserting an event described above. It could of course include the different features relating to the method for inserting an event according to one embodiment of the invention, which can be combined or taken separately.

For example, such a device can be integrated into a multiplexer or any other equipment of the broadcast network.

The invention also relates to a method for managing a transport stream broadcast in a broadcast network.

According to the invention, such a method implements the following steps:

obtaining at least one offset among:

at least one offset between an actual position of a current event packet in said transport stream, at the output of an equipment of the broadcast network, and a desired position of said current event packet in said transport stream, called processing offset, an offset determined according to a type of receiver intended to receive said transport stream, called reception offset, said current event packet being associated with content carried by said transport stream, and carrying a synchronisation header comprising:

reference time information defined with respect to a reference clock of said content;

a desired delay between said current event packet and a reference packet of said content identified based on said reference time information, said desired position being determined based on reference time information and on said desired delay, transmitting, to at least one other item of equipment of said broadcast network, said at least one obtained offset, or a global offset determined based on at least one obtained offset.

The proposed solution thus allows to collect in the same equipment, for example a service platform, at least one offset value related to the use of at least one equipment of the broadcast network or of the receiver.

In this way, it is possible to centralise the offset value (s) obtained, optionally to average the offset value (s) obtained, optionally to determine a global offset value from the (averaged) offset value (s) obtained, and to inform at least one item of equipment of the broadcast network, for example the SE inserter. It is thus possible to improve the precision of insertion of the events in the transport stream, and therefore the synchronisation of the events with the contents/components to which they relate, in particular at the receiver.

The invention also relates to a corresponding service platform.

Such a service platform, for example of the AdsReach® type as developed by the company ENENSYS TECHNOLOGIES®, is in particular adapted for implementing the management method described above. It could of course include the different features relating to the management method according to one embodiment of the invention, which can be combined or taken separately.

The invention also relates to a method for receiving a transport stream broadcast in a broadcast network.

According to the invention, such a method implements the following steps:
  receiving a transport stream carrying at least one current event packet associated with content carried by said transport stream, said current event packet carrying a synchronisation header comprising:
    reference time information defined with respect to a reference clock of said content,
    a desired or actual delay between said current event packet and a reference packet of said content identified based on said reference time information,
  synchronising an event carried by payload data of said current event packet with a reference point (for example a reference picture) associated with said reference time information, taking into account a waiting delay determined based on said synchronisation header of said current event packet.

The proposed solution thus allows, at a receiver, to synchronise an event with the content to which it relates.

The invention also relates to a corresponding receiver.

Such receiver is in particular adapted for implementing the reception method described above. It could of course include the different features relating to the reception method according to one embodiment of the invention, which can be combined or taken separately. In particular, such a receiver is a hybrid receiver, compatible with the HbbTV standard.

The invention also relates to a corresponding system, comprising at least one SE inserter and one SE monitoring (possibly combined with the SE inserter). Preferably, such a system also comprises a service platform allowing to store the various offsets and a receiver according to the invention.

The various methods according to at least one embodiment of the invention can be implemented in various ways, in particular in hardware form and/or in software form.

For example, at least one step of the methods described above can be implemented:
  on a reprogrammable calculation machine (a computer, a processor for example DSP ("Digital Signal Processor"), a microcontroller, etc.) executing a program comprising a sequence of instructions,
  on a dedicated calculation machine (for example a set of logic gates such as an FPGA ("Field Programmable Gate Array") or an ASIC ("Application-Specific Integrated Circuit"), or any other hardware module).

Consequently, an embodiment of the invention also aims at protecting one or more computer programs including instructions adapted to the implementation of the methods described above when this or these programs are executed by a processor, as well as at least one computer-readable information medium including instructions of at least one computer program as mentioned above.

4. LIST OF FIGURES

Other features and advantages of the invention will appear more clearly upon reading the following description of a particular embodiment, given by way of a simple illustrative and non-limiting example, and the appended drawings, among which:

5. DESCRIPTION OF EMBODIMENTS OF THE INVENTION 5.1 General Principle

As already indicated in relation to the prior art, there is conventionally, at the end of the broadcast chain (at the last equipment of the broadcast network or of a receiver), an offset between the actual position of an event and its desired position, defined relative to a reference point of the content to which the event relates.

Such an offset can be composed of several offsets coming from:
  all the variations introduced by the broadcast network (transport, (re) multiplexing, transcoding, etc.)
  the delay in processing the event and decoding the transport stream by the receiver.

The general principle of the invention is based on the determination of at least one of these offsets, and the compensation of this or these offsets.

The proposed solution thus allows to synchronise, or to maintain synchronisation, of an event with a reference point of a content, carried by a transport stream, signalled by this event. It can in particular be used to ensure the synchronisation of events of the content substitution type (for example in HbbTV), display of banners, in particular L-shaped banners ("L-Banner"), etc.

According to at least one embodiment, the proposed solution allows to:
  determine an offset (possibly an average offset) between a desired date/position of the event, and an actual date/position of insertion of the event, for example at the end of the broadcast chain (at the last equipment of the broadcast network—also called end equipment—or a receiver), and/or
  continuously measure this offset value and automatically adapt the correction for inserting the event into the transport stream according to the evolution of the network, and/or
  address several sub-networks including different offsets (since they do not use the same network structure and do not use the same equipment) and/or receivers including different features, and therefore adapt the synchronisation by compensating for the offsets introduced by the network and/or the receiver, even if the delays vary from one part of the network to another or from one receiver to another, and/or take into account synchronisation deviations up to the receiver.

5.2 Description of Main Equipment

A. General Architecture

Various modules implemented by the invention is presented below, for the transmission of event packets of the "Stream Event" type in the DSM-CC format in a transport stream in the MPEG-TS format. Of course, the invention is not limited to this type of event or transport stream formats.

Figure 2:
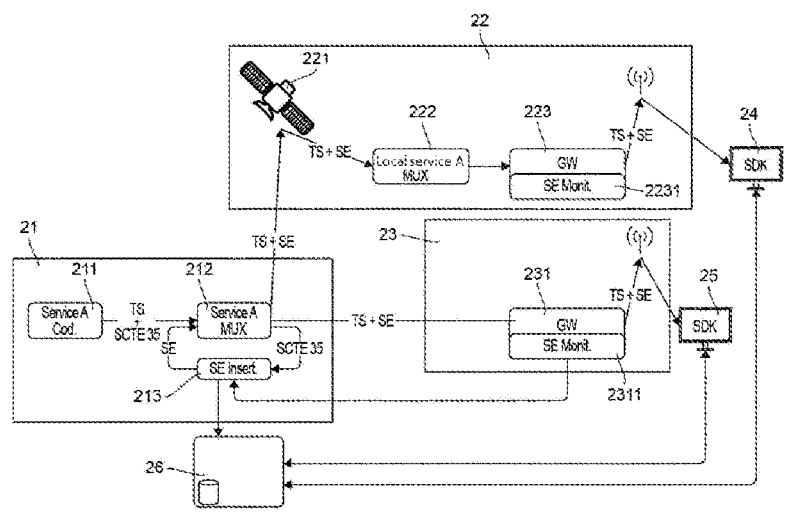
FIG. 2 illustrates an example of a broadcast network wherein the invention can implemented.

In order to illustrate the invention, the context of the broadcast network of FIG. 2, implementing:

- a headend 21, comprising at least one encoder 211 and one multiplexer 212, taking as input at least one content to be broadcast (for example a service A) and delivering as output a transport stream TS, and
- two broadcast sub-networks, broadcasting the transport stream TS to the receivers 24, 25, comprising:
  - a first satellite broadcasting sub-network 22 implementing a satellite 221, a multiplexer 222 and a gateway 223,
  - a second terrestrial broadcasting sub-network 23 implementing a gateway 231.

The receiver 24 receives for example the transport stream broadcast by the first satellite broadcasting sub-network 22, and the receiver 25 receives the transport stream broadcast by the second terrestrial broadcasting sub-network 23.

The transport stream can be composed of several contents, each content embedding its own reference clock.

Of course, such a network structure is purely illustrative.

According to an advantageous embodiment, in order to maintain optimal synchronisation of the insertion of the event until its use, the proposed solution can use several modules allowing to estimate the variations introduced and to correct them:

- an event insertion device 213, also called SE inserter, inserting event packets SE into the transport stream TS coming from the multiplexer 222, and
- at least one device for monitoring a transport stream at the output of broadcast network equipment, also called SE monitoring (for example integrated into the event insertion device 213 and configured to monitor the transport stream at the output of the multiplexer 222, or located at another place in the network and configured to monitor the transport stream at the output of a gateway, a transcoder, . . . , of the network); in the example illustrated in FIG. 2, the gateways 223 and 231 are each equipped with a monitoring device 2231 and 2311.

Optionally, a service platform 26 can also be provided to collect or supply information on the various equipment items of the network and on the receivers.

Finally, a specific application can be executed by the receivers 24 and 25.

The use of some of these modules (in particular the use of several monitoring devices, of a service platform, or of specific applications at the receivers) is optional, in particular if the precision the of desired synchronisation is low.

B. Device for Inserting an Event into a Transport Stream (SE Inserter)

Figure 3:
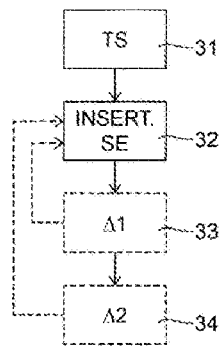
FIG. 3 shows the main steps implemented by a device for inserting an event according to one embodiment of the invention.

The main steps implemented by the device for inserting an event 213, also called SE inserter, are shown in relation to FIG. 3. The SE inserter can be dedicated equipment or a software module embedded in another equipment, for example in the encoder 211 or the multiplexer 212 of the headend.

Such a device allows to insert event packets into the transport stream.

Thus, during a first step 31, the SE inserter obtains a transport stream. At the first iteration, the transport stream carries no event packets. On subsequent iterations, the transport stream may optionally carry one or more event packets inserted during a previous iteration.

For example, the SE inserter takes as input the transport stream from the multiplexer 212, carrying one or more contents, or directly a transport stream from the encoder 211, generally carrying a single content, and delivers as output the transport stream carrying at least one current event packet associated with content. Optionally, it takes as input information allowing to identify a reference point in the content (message of SCTE 35 type, watermark, etc.).

Subsequently, for the sake of simplification, it is considered that the transport stream carries a single content (for example the service A). Similar steps can be implemented for each content carried by the transport stream.

The SE inserter generates at least one event packet from a content reference point (for example service A) carried by the transport stream.

More specifically, such a current event packet carries a synchronisation header comprising:

- reference time information defined with respect to a reference clock of the content;
- a desired delay between the current event packet and a reference packet of the content identified based on the reference time information.

For example, if the reference point is a reference picture, the reference time information corresponds to a restitution date (for example a PTS value) of the reference picture of the content carried by the transport stream, with reference to a reference clock (for example a PCR or TEMI clock) embedded in the content, and the reference packet is for example the first packet encoding the reference picture. In particular, the reference picture is an IDR (Instantaneous Decoder Refresh) picture.

During a second step 32, the SE inserter inserts the current event packet into the transport stream, at a position defined from the position of the reference packet and the desired delay. The SE inserter therefore seeks to ensure, during the insertion, the synchronisation of the event packet with the content to which it relates.

According to a first embodiment, a current event packet may be a measurement event packet inserted by the SE inserter to measure the offset (s) introduced by the various equipment items of the network.

According to a second embodiment, a current event packet may be a payload event packet carrying payload data associated with the event.

These two embodiments, described in more detail below, can be combined. For example, measurement event packets can be inserted at the beginning of the transport stream broadcast to determine the offsets to be corrected, then payload event packets can be inserted during the transport stream broadcast to maintain the synchronisation.

The transport stream into which at least one current event packet was inserted can then be broadcast in the broadcast network, or returned to the input of the multiplexer 212.

As described below, the current event packet inserted into the transport stream can be used by one or more monitoring devices distributed in the broadcast network to measure the offset (s) introduced by the network, called processing offsets.

The processing offset (s) obtained may optionally be transmitted to the SE inserter 213, directly or via another equipment, for example the service gateway 26, so that it modifies the position of the current event packet in the transport stream to compensate for the processing offset (s), or that it can insert a subsequent event packet into the transport stream in anticipation of that processing offset.

Thus, according to a particular embodiment, the SE inserter 213 obtains during a step 33 a processing offset Δl between an actual position of the current event packet in the transport stream, at the output of an equipment to be monitored of the broadcast network (for example the multiplexer 212, the gateway 231, the gateway, 223, etc.), and a desired position of the current event packet in the transport stream, determined based on the reference time information and on the desired delay.

The SE inserter can in particular determine this offset value itself (for example if it has a monitoring device), or receive this offset value from a network monitoring device (for example the SE monitoring 2231 or 2311), directly or via the service platform 26, for example in the form of notifications.

Obtaining this processing offset by the SE inserter 213 allows in particular to correct the position of the current event packet in the transport stream, or to insert a subsequent event packet in the transport stream at a desired position, so as to compensate for a processing offset introduced by at least one network equipment (multiplexer 212, gateway 223, gateway 231, etc.).

This offset can in particular be transmitted to another equipment in the broadcast network, for example to the service platform 26.

In particular, the SE inserter 213 can determine an "average" processing offset upon receiving several processing offset values from the same monitoring device, or directly receive an "average" processing offset.

According to a particular embodiment, the SE inserter 213 can also implement the reception 34 of a reception offset 42 determined according to a type of receiver intended to receive the transport stream.

For example, the features of different receivers according to their type (for example according to their brand, their model) can be determined during laboratory tests and stored in a database. Such a database can be accessible to the SE inserter 213, directly or via the service platform 26. In this way, it is also possible to estimate the offset introduced by the receiver between the display of the reference picture and the reception of the event packet, at the HbbTV application for example, and to compensate for this offset.

Note that these steps for obtaining a processing offset 33 or a reception offset 34 are optional, and can be implemented independently of one another.

The SE inserter thus has the possibility of receiving notifications from the service platform or from a network monitoring device, carrying at least one processing offset or reception offset value.

The offset (s) obtained, optionally averaged, can be used by the SE inserter to modify the position of the current event packet in the transport stream and/or to insert a subsequent event packet into the transport stream at a position allowing to ensure synchronisation between the event and the reference point to which it refers, by compensating for the offset (s) obtained. In particular, a subsequent event packet can be a "conventional" event packet, in the DSM-CC format for example, not carrying a synchronisation header. It can in particular be associated with content distinct from the current event packet.

For example, the SE inserter integrates a value of processing offset or reception offset during the insertion of an event packet by adding the value received to the initially planned offset during the insertion. This is intended to achieve correct synchronisation of the event packet at broadcast time by compensating for network actions on the position of the event packet relative to the reference point with which it is synchronised.

This feedback loop can be permanent, which allows to maintain synchronisation even if certain parameters of the broadcast network are modified, or implemented occasionally (for example during the installation of the network, when adding a new equipment in the network, at regular time intervals (once a week, once a month, etc.), when a loss of synchronisation is detected, etc.

In summary, the SE inserter can perform at least one action among:
  inserting at least one event packet (measurement event packet, payload event packet synchronised with the content to which it relates);
  correcting the synchronisation during the insertion of an event packet, by compensating for the processing and/or reception offsets;
  etc.

C. Event Packets

As noted above, different event packets can be used to measure the offset (s) and improve synchronisation.

Thus, according to a first embodiment, a current event packet may be a measurement event packet inserted by the SE inserter to measure the offset (s) introduced by at least one item of network equipment. In this case, the SE inserter takes as input the transport stream coming from the multiplexer 212, or from the encoder 211, and delivers as output a transport stream carrying at least one measurement event packet.

For example, the SE inserter selects a picture in the content, called the reference picture. This picture can be selected randomly. The SE inserter reads the PTS value associated with this reference picture, and stores it in the "reference time information" field of the synchronisation header of the measurement event packet. The SE inserter inserts the measurement event packet just before the first packet carrying the reference picture, called the reference packet, and stores a zero value in the "desired delay" field. Alternatively, the SE inserter replaces a padding packet in the transport stream with the measurement event packet, and stores in the "desired delay" field a value corresponding to the number of TS packets using the same reference clock (that is to say associated with the same content) between the padding packet replaced by the measurement event packet and the first packet carrying the reference picture.

It is noted for this purpose that this offset or delay can be calculated in number of TS packets based on the clock used for the reference time information. For example, the offset is calculated in number of TS packets belonging to the same content. Alternatively, the offset can be calculated in number of TS packets belonging to the transport stream. In this case, if the increment of the clock value between two TS packets belonging to the same content is X ms, this value can be divided by the number of transport stream TS packets between two TS packets belonging to a same content. The use of all transport packets is therefore more precise, because each packet corresponds to a shorter duration.

The time conversion can be performed by multiplying the number of gap packets by the duration of emission of a TS packet.

The duration of emission of a packet can be calculated by counting the number of packets in the transport stream between two packets carrying a value of the same reference clock (PCR or TEMI for example).

In particular, a measurement event packet carries a synchronisation identifier, allowing other network equipment or receivers to detect that it is a packet used for synchronisation.

Figure 4:
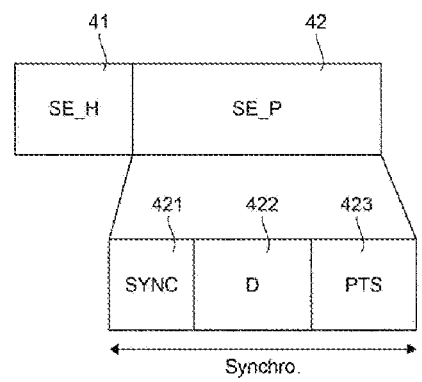
FIG. 4 illustrates the structure of a measurement event packet according to one embodiment of the invention.

FIG. 4 illustrates an example of the structure of such a measurement event packet, comprising an SE_H header 41 ("SE header"), and an SE_P payload part 42 ("SE payload"). The payload part 42 comprises only a synchronisation header, carrying for example three fields:
- a field SYNC 421, for example on 4 bytes, carrying a synchronisation identifier allowing to identify that the event packet is used for synchronisation. It can contain for example the value "ARSC" coded in ascii;
- a field D 422 ("Delay ms"), for example on 2 bytes, carrying a desired delay between the measurement event packet and a content reference packet, identified based on the information reference time (the reference packet being for example the first packet carrying the reference picture whose PTS value is present in the field PTS 423); such a delay or offset is expressed in particular in time (for example in milliseconds or in nanoseconds) to be able to be used by the receivers,
- a field PTS 423, for example over 5 bytes, carrying reference time information defined with respect to a reference clock embedded in the content (for example the PTS value of the reference picture).

Such a payload event packet can be used by the successive equipment of the network to measure the offset (s), introduced by the various equipment of the network, between the actual position of the payload event packet (Stream Event) and its desired position.

In particular, such a measurement event packet carries a packet identifier (PID) indicating that it is of the event packet type, or a ghost PID. Conventionally, a ghost PID is not referenced in any stream description table (PAT, PMT). It is therefore only interpretable by equipment that has been specifically configured to use it, and ignored by other equipment.

In particular, the SE inserter uses the same PID for the event packet and the payload packets of a content. In this way, potential problems of implementation of certain equipment are eliminated. For example, if an equipment uses one queue per PID as input, the processing of the queues may be different. If the event packet and the payload packets of the same content carry the same PID, they are processed in the same way by the equipment, which allows to ensure an accurate measurement of the delay.

According to a second embodiment, a current event packet may be a payload event packet carrying payload data associated with an event. In this case, the SE inserter takes as input the transport stream from the multiplexer 212, or the content from the encoder 211, and information allowing to select a reference picture in the content (SCTE 35 type message, watermark, etc.), and outputs a transport stream carrying at least one payload event packet. For example, the SE inserter selects a content reference picture.

According to this second embodiment, the SE inserter inserts, into the transport stream, at least one payload event packet synchronised with the content to which it relates.

According to a first variant, the reference picture can be identified based on an SCTE 35 type message. Indeed, the SE inserter can receive on its input the transport stream coming from the multiplexer 212 and from the SCTE 35 messages (for example of the "time-signal" or "splice insert" type) containing PTSs that reference pictures. Such SCTE messages 35 can be sent in pre-roll, for example a few seconds before the picture that they reference. Synchronisation can be performed when converting SCTE messages into event packets, using the PTS value of the reference picture and the PCR of the content.

According a second variant, the reference picture can be identified based on a watermark carried by the reference picture. In this case, the SE inserter seeks to detect, in the content, a picture bearing a watermark known to the SE inserter ("fingerprint video"). This variant allows to dispense with SCTE messages 35, but requires knowledge of the watermarks associated with the pictures to be detected. It may also be necessary to add storage in buffer memory (also called "buffering") of the transport stream, in order to allow insertion of a payload event packet upstream of a reference picture.

The SE inserter reads the PTS value associated with this reference picture, and stores it in the "reference time information" field of the synchronisation header of the payload event packet.

The SE inserter inserts the payload event packet taking into account the desired delay between the payload event packet and the reference packet (value chosen by the SE inserter, insertion pre-roll value, or value measured at a previous iteration for example).

In particular, such a payload event packet carries a synchronisation identifier, allowing the other network equipment or the receivers to detect that it is a packet used for synchronisation.

Figure 5:
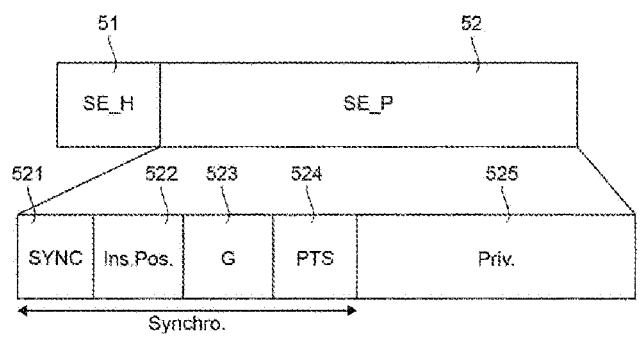
FIG. 5 illustrates the structure of a payload event packet according to one embodiment of the invention.

FIG. 5 illustrates an example of the structure of such a payload event packet, comprising an SE_H header 51 ("SE header"), and an SE_P payload part 52 ("SE payload"). The payload part 52 comprises a synchronisation header and payload data 525, for example private data describing the event.

The synchronisation header comprises for example four fields:
- a field SYNC 521, for example on 4 bytes, carrying a synchronisation identifier allowing to identify that the event packet is used for synchronisation. It can contain for example the value "ARSU" coded in ascii;
- a field Ins. pos. 522, for example on 2 bytes, carrying a desired delay between the payload event packet and a reference packet of the content identified based on the reference time information (the reference packet being for example the first packet carrying the reference picture whose PTS value is present in the field PTS 524). Such a delay or offset is expressed in particular in time (for example in milliseconds or in nanoseconds) to be able to be used by the receivers,
- a field PTS 524, for example on 5 bytes, carrying reference time information defined with respect to a reference clock embedded in the content (for example the PTS value of the reference picture),
- possibly a field G 523 ("gap"), for example on 2 bytes, carrying a measured offset value between the desired position of the payload event packet (determined from the field Ins. Pos.) and its actual position in the transport stream. Such a delay or offset is expressed in particular in time (for example in milliseconds or in nanoseconds) to be able to be used by the receivers. In particular, if the event packet is inserted at the right place in the transport stream (that is to say its actual position coincides with its desired position), the value of this field is equal to 0.

In particular, the values of the fields Ins. Pos. 522 and G 523 can be updated throughout the broadcast chain, for example by monitoring devices, and used by the receiver to correct the synchronisation.

A payload event packet can be used by the successive equipment of the network to measure the offset (s), introduced by the various equipment of the network, between the actual position of the payload event packet (Stream Event) and its desired position.

In particular, at a receiver, a payload event packet may include, in the field Ins. Pos., an offset value in milliseconds between the reception of the payload event packet (actual position of the event packet) and the actual position of the display of the reference picture signalled by the event packet (position of the reference packet). Knowledge of this value in particular allows the receivers to delay the launching of an action upon receiving the payload event packet.

As already indicated, for the offset measurement, this value can be expressed in TS packets. On the other hand, it can be converted into time (for example millisecond or nanosecond) to be used by a receiver.

D. Monitoring Device (SE Monitoring)

As indicated above, certain broadcast network equipment, for example the SE inserter 213 and/or the gateway 223 of the first broadcast sub-network, and/or the gateway 231 of the second broadcast sub-network, etc.), can cooperate with a monitoring device, allowing to determine the processing delay introduced by this equipment or by the network up to this equipment. For example, as illustrated in connection with FIG. 2, the gateway 223 is monitored by the monitoring device 2231, and the gateway 231 is monitored by the monitoring device 2311. Other network equipment could also be monitored by a monitoring device, in particular equipment which modifies the transport stream by modifying the scheduling of the packets (multiplexer, transcoder for example).

Figure 6:
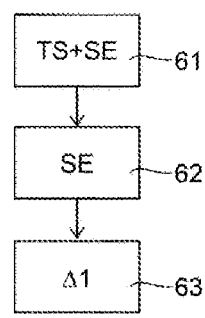
FIG. 6 shows the main steps implemented by a device for monitoring a transport stream at the output of an equipment of the broadcast network according to one embodiment of the invention.

In relation to FIG. 6, the main steps implemented by a monitoring device, also called SE monitoring, are presented. The SE monitoring can be dedicated equipment or a software module embedded by another equipment (for example the SE inserter 213 and/or the gateway 223 and/or the gateway 231).

During a first step 61, the SE monitoring obtains a transport stream delivered by the equipment to be monitored (that is to say the transport stream at the output of the equipment to be monitored, denoted TS+SE), carrying at least one current event packet.

During a following step 62, the SE monitoring searches, in the transport stream, for event packets carrying a synchronisation header (measurement event packet (s) and/or payload event packet (s)). For example, the SE monitoring reads the field SYNC 421, 521 of an event packet and detects that it is an event packet used for synchronisation.

As already described, such a current event packet, previously inserted by the SE inserter 213, is associated with content carried by the transport stream (for example, service A) and carries a synchronisation header comprising:
  reference time information defined with respect to a reference clock of the content;
  a desired delay between the current event packet and a reference packet of the content identified based on the reference time information, From the information present in the synchronisation header, the SE monitoring can determine 63 an offset between an actual position of the current event packet in the transport stream, and a desired position of the current event packet in the transport stream, called processing offset.

Figure 1:
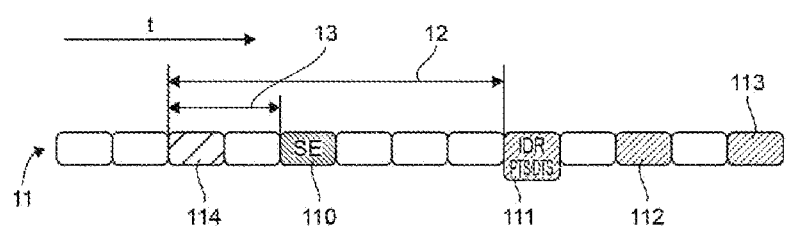
FIG. 1 illustrates an example of an MPEG-TS stream received by a receiver.

If the example illustrated in FIG. 1 is taken, the reference time information allows to identify the reference packet 111. The desired delay between the current event packet 110 and the reference packet is defined by the pre-roll 12, and allows to define the desired position 114 of the current event packet in the transport stream. The offset between the actual position of the current event packet 110 and its desired position 114 corresponds to the processing offset 13 (Δ1).

For example, if the current event packet detected is a payload event packet, the SE monitoring extracts the value of the field PTS 524, carrying the reference time information, and the value of the field Ins. Pos. 522, carrying the desired delay between the payload event packet and a reference packet of the content identified based on the reference time information.

The SE monitoring then searches for the position of the reference packet in the transport stream, that is to say the position of the packet (for example a video packet) containing the PTS value of the field PTS 524.

From the position of the reference packet and the value of the field Ins. Pos. 522, the SE monitoring determines the desired (that is to say theoretical) position of the event packet, and the difference in number of TS packets between the actual position of the event packet and its desired position.

This difference, corresponding to the processing offset, can optionally be stored in the field G 523 of the synchronisation header of the event packet, as described below.

The SE monitoring can transmit the processing offset thus determined to at least one other item of equipment in the broadcast network, for example in the form of a notification: to the SE inserter 213, to the service platform 26, to equipment downstream of the broadcast network, etc.

In this way, it is possible to inform the other equipment on the network of the offset introduced by the equipment to be monitored in order to compensate for this offset value. Such processing offset compensation can be implemented:
  upstream of the equipment to be monitored, or in the equipment to be monitored, so that the event is synchronised with the content to which it relates in the transport stream at the output of the equipment to be monitored, or
  downstream of the equipment to be monitored, so as to correct the synchronisation of the event in equipment downstream of the broadcast network.

According to a particular embodiment, the SE monitoring updates the synchronisation header with the processing offset thus determined. For example, the value of the field G 523 is updated by replacing it with the processing offset Δ1. In this way, it is possible to inform the other equipment of the network of the processing offset introduced by the equipment to be monitored. In particular, a CRC (for "Cyclic Redundancy Check) can be recalculated for the updated event packet. Note that this update does not modify the position of the packets in the transport stream and therefore does not impact the values of the reference clock.

According to another embodiment, the SE monitoring implements a step of modifying the position of the current event packet in the transport stream taking into account the processing offset, and a step of transmitting the modified transport stream. In this way, it is possible to compensate for the processing offset before continuing to broadcast the transport stream.

For example, if the current event packet is a payload event packet, the SE monitoring reads the value of the field Ins. Pos. 522, carrying the desired delay between the payload event packet and a reference packet of the content identified based on the reference time information, and the PCR value of the event packet.

The SE monitoring then searches for the reference packet serving as a reference to find the insertion point (for example the first packet carrying the reference picture whose PTS value is present in the field PTS 524).

The SE monitoring can then move the event packet to insert it at the desired position with respect to the PCR value. To carry out this movement, the SE monitoring has a buffer memory. For example, a buffer of 1 second allows to catch up with lags of 1 second at most. This modification requires an adjustment of the PCRs of the transport stream. In particular, the SE monitoring can only move the event packet an integer number of TS packets. If the offset value it receives is in ms, it converts this value to the number of TS packets.

In particular, the SE monitoring can implement a step of removing the synchronisation header from the current event packet before the transmission of the modified transport stream, in particular if the current event packet is of the payload event packet type. Indeed, once the current event packet is correctly positioned in the transport stream to compensate for the processing offset, it is no longer necessary to keep the synchronisation header of the current event packet. In this way, the offset compensation to improve the synchronisation of an event with the content to which it relates is transparent for the receivers receiving the transport stream, and compatible with current hybrid receivers.

According to a particular embodiment, the processing offset is an average offset obtained at the end of at least two iterations of the steps of detecting a current event packet and determining an offset between an actual position of the current event packet in the transport stream, and a desired position.

As already indicated, one or more SE monitoring can be provided in the broadcast network (an SE monitoring integrated into the SE inserter, or an SE monitoring at a single gateway, or an SE monitoring at each broadcast gateway, or an SE monitoring integrated into the SE inserter and an SE monitoring at each broadcast gateway, etc.).

In this case, each SE monitoring can use the specific information carried by an event packet to execute at least one action among:
  determining the desired position of an event packet relative to a content reference point to which the event relates;
  determining the actual position of the event packet relative to the reference point of the content to which the event relates;
  determining the offset between the actual and desired positions;
  storing the determined offset or position (s);
  sending the determined offset or position (s) to another equipment of the broadcast network, for example to the service platform 26 (for example via an IP connection) and/or to the SE inserter 213;
  updating the synchronisation header of the event packet (for example the field G 523 of a payload event packet), which can be transmitted to the following equipment in the broadcast chain up to the receivers (and therefore used by the receiver for synchronisation);
  modifying the position of the current event packet in the transport stream to compensate for the offset, by replacing the event packet as close as possible to its desired insertion position;
  etc.

It is also noted that in the event of a significant lag in the event packets, a reference packet (that is to say containing for example a PTS value sought in the content) can be received before the event packet which references it. It is therefore desirable to also keep in memory the last PTS values received and their position in the transport stream (that is to say position of the reference packets and PTS contained in these reference packets). Similarly, it may be desirable to set up a buffering of the transport stream in order to be able to modify the position of the event packet in the transport stream, even if the insertion position has passed with respect to the reception of the event packet.

E. Service Platform

According to a particular embodiment, the proposed solution implements a service platform, for example the internet service platform 26 illustrated in FIG. 2, allowing in particular to receive and store the various processing and/or reception offset values, and transmit them to the concerned equipment.

Such a service platform can in particular be configured to communicate with the SE inserter 213, with one or more SE monitoring 223, 231, with one or more receivers 24, 25, etc.

Figure 7:
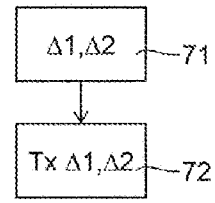
FIG. 7 shows the main steps implemented by a service platform according to one embodiment of the invention.

The main steps implemented by the service platform 26 are presented in relation to FIG. 7.

During a first step 71, the service platform 26 obtains at least one offset among:
  at least one offset between an actual position of a current event packet in the transport stream, at the output of a broadcast network equipment, and a desired position of the current event packet in the transport stream (processing offset),
  an offset determined according to a type of receiver intended to receive said transport stream (reception offset).

For example, obtaining at least one processing offset ($\Delta 1$) implements the reception of at least one offset determined by an SE monitoring.

In other words, at least one SE monitoring present in the broadcast network determines a processing offset at the output of an equipment of the network, and transmits this processing offset to the service platform 26. If several processing offset values are received for the same equipment to be monitored, the service platform can determine an average offset associated with this equipment.

Obtaining a reception offset ($\Delta 2$) implements for example the reading of a database storing the features of the various receivers according to their type. For example, the service platform can identify the type of receiver from a request emitted by the receiver and received by the service platform. In particular, the platform can use the user agent (or UA) of an http request emitted by the receiver to recognise the receiver. For example, filtering is applied to the UAs to determine the receiver type.

During a following step 72, the service platform transmits the processing and/or reception offset (s) obtained, optionally averaged, to at least one other item of equipment in the broadcast network. Alternatively, the service platform can transmit an overall offset determined from the processing and/or reception offset (s) obtained, which are optionally averaged. In particular, if processing offset values are received for equipment belonging to different sub-networks (for example a first processing offset value related to the gateway 223 of the first sub-network 22, and a second offset value related to the gateway 231 of the second sub-network 23), the gateway transmits to the SE inserter 213 the largest processing offset value, allowing to compensate for all the lags induced by the various sub-networks. An example is presented next.

The service platform can therefore perform at least one action in connection with the receivers, among:
  storing reception offsets (that is to say delays related to the receivers or synchronisation information) per type of receiver;
  identifying a type of receiver, for example by using the UA in the http request;
  transmitting to the receiver the reception offset determined according to the type of receiver (that is to say delay to be used to maintain synchronisation or synchronisation information), for example via an HbbTV application;
  receiving network delay information sent by the receivers; etc.

The service platform can also perform at least one action in connection with the other equipment of the broadcast network, among:
  storing processing offsets (that is to say delays measured in the network, determined by the SE monitoring (s) and the SE inserter);
  determining average processing lags/offsets;
  calculating the minimum anticipation delay for the insertion of the event packet to compensate for all the lags induced by the different sub-networks, in the case of a network including several sub-networks, so that the event packet can be used in all sub-networks;
  notifying the various network equipment (in particular the SE inserter) of the processing and/or reception offset (s) to be applied to optimise synchronisation;
  etc.

F. Receiver

The proposed solution can be implemented in hybrid receivers, in particular supporting the HbbTV standard. Such receivers are in particular suitable for receiving conventional event packets, in particular SE packets in the DSM-CC format as defined in the aforementioned standard ISO/IEC 13818-6.

According to a particular embodiment, such receivers can implement a software module, denoted SDK, which can be integrated into an HbbTV application intended to be executed on the receivers. In this case, the receivers are adapted to receive event packets according to the invention, carrying a synchronisation header as described previously. Such a software module can in particular be used to improve the synchronisation on the receiver.

In particular, for the HbbTV application to be able to synchronise an event with the content to which it relates, it can either receive an event synchronised with the content, or receive an event in advance as well as the delay between this event and the synchronisation point.

In the first case, the implementation of the software module is not necessary since the synchronisation is carried out upstream. In the second case, the implementation of the software module allows to use the information carried by an event packet to synchronise the event with the content at the receiver. In this second case, to perform the synchronisation, the software module uses the date of reception of the event packet, the information carried by the synchronisation header of the event packet, and, if available, the information related to the receiver (allowing to compensate for the reception offset).

Figure 8:
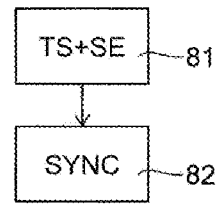
FIG. 8 shows the main steps implemented by a receiver according to one embodiment of the invention.

Thus, FIG. 8 illustrates the main steps implemented by a receiver according to the invention.

Such a receiver implements the reception 81 of a transport stream carrying at least one current event packet associated with content carried by the transport stream, the current event packet carrying a synchronisation header comprising:
  reference time information defined with respect to a reference clock of said content,
  a desired or actual delay between the current event packet and a reference packet of the content identified based on the reference time information.

In particular, if the event packet is a payload packet wherein the synchronisation header was updated, the delay stored in the field Ins. Pos. maybe the actual delay between the current event packet and the reference packet.

During a following step, the receiver synchronises 82 the event carried by payload data of the current event packet with a reference point associated with the reference time information, taking into account a waiting delay determined from the synchronisation header of the current event packet.

The preceding steps allow to compensate for the processing offset (s) related to the equipment of the broadcast network.

Optionally, to compensate for the reception offset related to the type of receiver, the receiver implements a step of obtaining a reception offset, received for example from the service platform. The receiver, or the software module, can thus communicate with the platform to obtain the reception delay related to the type of receiver.

In this case, the waiting delay also takes this reception delay into account.

In other words, the receiver can perform a resynchronisation of an event with the content to which it relates, for example the display of a video, using the processing and/or reception offset values obtained in the event packets and/or via the service platform.

In particular, it is possible to filter, at a receiver, the synchronisation headers. In this case, only the payload part is uploaded to the HbbTV application, at the right time. In this way, the synchronisation operation can be transparent to the HbbTV application.

The software module, executed on the receiver, can thus implement at least one action among:
  subscribing, with the receiver, to the reception of event packets present in the transport stream;
  obtaining information on the type of the receiver via an http request to the service platform, in particular a reception offset. This value is in particular related to the decoding delay of the content (for example a video) in the receiver and to the delay for reporting events to the HbbTV middleware;
  extracting information from the synchronisation header when an event packet is received, allowing the event to be synchronised with the content to which it relates;
  determining a waiting delay between the reception of an event packet and the notification of the HbbTV application. This value corresponds to the resynchronisation in the receiver. The waiting delay is for example equal to the sum of the pre-roll value, the lag/delay added by the network (processing offset), the lag/delay added in the receiver (receiving offset). For this purpose, the software module can use the value of field G 523 of the synchronisation header, which carries a processing offset value related to the broadcast network (lag or advance of the event packet) and optionally the reception offset value related to the receiver;

at the end of the waiting delay, notifying the HbbTV application with the payload data of the event packet;

sending to the service platform the offset information carried by the event packets to allow the monitoring of the broadcast network;

etc.

G. Transcoder

In the case where the transport stream passes through equipment of the transcoder type, it should be noted that the structure of the transport stream can be modified: the transcoder can change the values of the reference clock embedded in the content (and therefore the reference time information, for example the PTS) and/or modify the position of the reference pictures in the transport stream.

Figure 9:
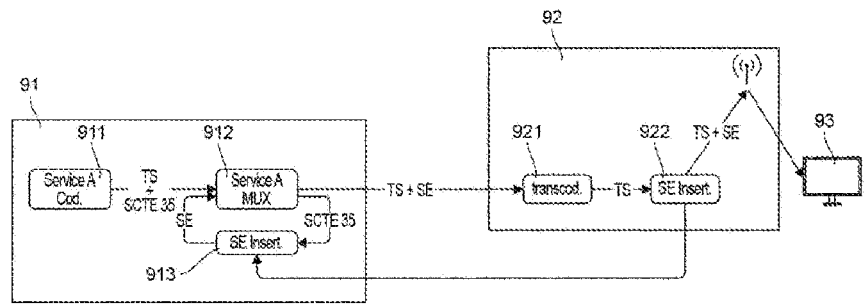
FIG. 9 illustrates an example of a broadcast network implementing a transcoder.

FIG. 9 illustrates an example of a broadcast network implementing a transcoder, comprising:

a headend 91, comprising at least one encoder 911 and one multiplexer 912, taking as input at least one content to be broadcast (for example a service A) and delivering as output a transport stream TS, and a terrestrial broadcasting sub-network 92, broadcasting the transport stream TS to a receiver 93, implementing a transcoder 921.

The headend also implements a first SE inserter 913 as described previously.

In the event of modification of the reference clock of a content, if the transcoder 921 is able to keep the SCTE packets 35 and to correct the PTS values to bring them into conformity with the new reference clock, then equipment upstream of the transcoder will be able to delete the previously inserted event packet (s) and perform a new insertion using the modified SCTE commands.

If the passage delay in the transcoder is fixed and known, it is possible to have a processing offset applied to all the transport stream event packets, by equipment downstream of the transcoder. Event packets can either be moved in the transport stream to anticipate this processing offset, or their synchronisation header can be updated with this new processing offset value. The synchronisation header PTS values must also be updated.

If the transcoder changes neither the clocks nor the structure of the transport stream (the reference picture is kept) then the previously inserted event packets remain valid.

If the transcoder changes the entire structure of the transport stream, synchronisation between an event packet and the content to which it relates is usually lost. In this case, a second SE inserter 922 can be provided downstream the of transcoder 921. Synchronisation can then be maintained by determining a watermark of at least one reference picture at the headend by the first SE inserter 913. The second SE inserter 922 can receive the watermark (s) from the first SE inserter 913 and search for the corresponding pictures in the transport stream. When the pictures are found, the second SE inserter 922 can reproduce the event packets as previously described in connection with the SE inserter 213 and insert them into the transport stream.

Note that this embodiment requires buffering the transport stream to allow the insertion of event packets at the requested position.

5.3 Examples of Embodiments

Few examples of implementations of the invention are presented below.

A. Headend Synchronisation

Figure 10:
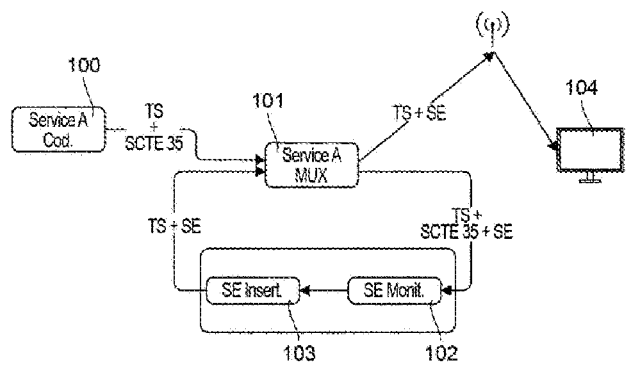
FIG. 10 illustrates an example of implementation of the synchronisation at the headend of the network according to a particular embodiment.

According to a first example, illustrated in FIG. 10, the only aim is to measure the offset introduced between an event packet and the content to which it relates at the headend.

For this purpose, it is considered that the headend comprises, in a conventional manner, an encoder 100 and a multiplexer 101. The headend also comprises an SE monitoring 102 and an SE inserter 103 according to one embodiment of the invention.

The SE monitoring 102 and the SE inserter 103 can be hosted on the same equipment or on separate equipment.

As illustrated in FIG. 10, the multiplexer 101 receives content, for example video streams, coming from different coders, in particular from the coder 100. Such content can contain SCTE commands 35. It multiplexes the video streams, and thus multiplexes it, and the multiplex thus produced is sent in the form of a transport stream as input to the SE monitoring 102 and to the broadcasting equipment.

If it does not detect any event packet in the transport stream (for example it does not detect any synchronisation header or synchronisation identifier in the field SYNC), the SE monitoring 102 does not perform any processing on the transport stream and forwards it to the SE inserter 103.

If an SCTE command is detected, it can be transformed a payload event packet by the SE inserter. The SE inserter 103 can thus produce a payload event packet from the SCTE command and the video stream to which it relates, and return the transport stream and the event packet to the input of the multiplexer 101. The multiplexer 101 takes the event packet thus produced and adds it to its output multiplex. As a reminder, an SCTE command 35 is conventionally sent N seconds in advance with respect to the reference picture. The SCTE has therefore been passed for N seconds when the reference picture in turn passes through the multiplexer.

If it detects an event packet in the transport stream (for example it detects a synchronisation header or a synchronisation identifier in the field SYNC), the SE monitoring 102 estimates the offset induced by the insertion loop and the multiplexer 101. Then, it notifies the SE inserter 103 with the calculated value (directly or via a service platform).

The SE inserter 103 can thus correct this offset by anticipating or lagging the insertion of the subsequent event packets.

For more robustness, the value used to compensate for the offset can be averaged over time.

Alternatively or in addition, the SE inserter 103 can produce a measurement event packet from a video stream carried by the transport stream, and return the transport stream and the event packet to the input of the multiplexer 101. The multiplexer 101 takes the event packet thus produced and adds it to its output multiplex.

For example, the SE inserter 103 replaces, in the transport stream, padding packets with measurement event packets and updates the "desired delay" field (D 422 for example) with the offset between a reference packet (containing the reference time information, of the PTS type for example) and the padding packet replaced by the measurement event packet.

Such a measurement can be performed periodically so that the headend can self-adapt to potential variations in delay when inserting event packets.

According to this first example, the synchronisation is therefore only implemented at the headend.

B. Same Delay Across the Entire Network

According to a second example, it is considered that the transport stream which arrives at all the emitters of the network contains the same offset between the desired position and the actual position of the event packet, with respect to the content to which it relates.

For example, an SE monitoring measures this offset value at the end of the network equipment (for example a broadcasting gateway) and notifies this offset value to the SE inserter, directly or via a service platform.

The value obtained by the SE inserter is used to anticipate the insertion of subsequent event packets. This anticipation of the insertion allows to compensate for the delay induced by the network. Optionally, the synchronisation header of event packets can be removed once the lag induced by the network is compensated.

If the offset measurement is continuous, then the SE inserter can adapt the insertion anticipation automatically so that the synchronisation is optimal.

C. Different Delays on Sub-Networks

According to a third example, a broadcast network comprising a headend supplying at least two sub-networks is considered with different processing and/or equipment.

The proposed solution allows to prevent an event packet from being lagged on a sub-network, and arriving too late at certain receivers to achieve synchronisation.

It is considered according to this example that each sub-network is equipped with an SE monitoring, monitoring for example the end equipment of the sub-network. The SE monitoring of each sub-network can send their measured processing offset value to the SE inserter of the headend, or to a service platform. The SE inserter or service platform determines the longest processing offset value. This value is used by the SE inserter to insert the subsequent event packets, in order to anticipate that offset.

The SE monitoring of a sub-network can modify the headers of the event packets that it receives to register therein the advance of insertion of the event packet for the subsequent sub-network. The software module of the receiver can in particular use these values to improve synchronisation.

For example, if three sub-networks are used and induce the following lags between the desired position and the actual position of an event packet:
  sub-network 1: 150 ms,
  sub-network 2: 50 ms,
  sub-network 3: 700 ms,
  then the SE inserter can insert event packets 700 ms before their desired insertion position.

The SE monitoring present in each sub-network can insert the following values in the "desired delay" field (D 422 or Ins. Pos. 522 for example) of event packets:
  sub-network 1: 550 ms (that is to say 700 ms-150 ms),
  sub-network 2: 650 ms (that is to say 700 ms-50 ms),
  sub-network 3: 0 ms.

The software module of the receiver waits during the waiting delays defined above before triggering an action (display of a pop-up for example) synchronised with the content to which it relates. Note that this part of the synchronisation does not require the receiver to be connected.

If the receiver is connected, the software module can further improve the synchronisation by taking into account the reception offset related to the type of receiver. For example, the software module can ask a service platform if the receiver on which it is running induces an additional offset (advance or lag). The value of this reception offset is then used by the software module to resynchronise the actions.

5.4 Corresponding Devices

Figure 11:
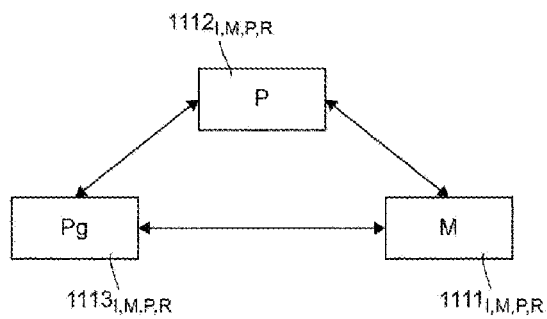
FIG. 11 illustrates the simplified structure of an SE inserter, of an SE monitoring, of a service platform, or of a receiver according to one embodiment of the invention.

Finally, the simplified structure of an SE inserter, of an SE monitoring, of a service platform or of a receiver according to one embodiment of the invention is presented in relation to FIG. 11.

An SE inserter according to one embodiment of the invention comprises a memory $1111_I$ (comprising for example a buffer memory) and a processing unit $1112_I$ (equipped for example with at least one processor, FPGA, or DSP), controlled or pre-programmed by an application or a computer program $1113_I$ implementing the method for inserting an event according to one embodiment of the invention.

Upon initialisation, the computer program code instructions $1113_I$ are for example loaded into a RAM memory before being executed by the processing unit $1112_I$. The processing unit $1112_I$ implements the steps of the method for inserting an event into a transport stream described previously, according to the instructions of the computer program $1113_I$. For this purpose, according to one embodiment, the processing unit $1112_I$ is configured for:
  obtaining the transport stream,
  inserting, in the transport stream, at least one current event packet associated with content carried by the transport stream, the current event packet carrying a synchronisation header comprising:
    reference time information defined with respect to a reference clock of said content;
    a desired delay between said current event packet and a reference packet of said content identified based on said reference time information, the current event packet being inserted into the transport stream at a position defined from the position of the reference packet and the desired delay.

An SE monitoring according to one embodiment of the invention comprises a memory $1111_M$ (comprising for example a buffer memory) and a processing unit $1112_M$ (equipped for example with at least one processor, FPGA, or DSP), controlled or pre-programmed by an application or a computer program $1113_M$ implementing the method for monitoring a transport stream at the output of an equipment of a broadcast network according to one embodiment of the invention.

Upon initialisation, the code instructions of the computer program $1113_M$ are for example loaded into a RAM memory before being executed by the processing unit $1112_M$. The processing unit $1112_M$ implements the steps of the monitoring method described above, according to the instructions of the computer program $1113_M$. For this purpose, according to one embodiment, the processing unit $1112_M$ is configured for:
  obtaining a transport stream delivered by the equipment to be monitored,
  detecting a current event packet associated with content carried by the transport stream, the event packet carrying a synchronisation header comprising:
    reference time information defined with respect to a reference clock of said content;
    a desired delay between said current event packet and a reference packet of said content identified based on said reference time information,
  determining an offset between an actual position of the current event packet in the transport stream, and a position of said current event packet in the transport stream, determined based on the reference time information and on the desired delay (processing offset).

A service platform according to one embodiment of the invention comprises a memory $1112_P$ (comprising for example a buffer memory) and a processing unit $1112_P$ (equipped for example with at least one processor, FPGA, or DSP), controlled or pre-programmed by an application or a computer program $1113_P$ implementing the transport stream management method according to one embodiment of the invention.

Upon initialisation, the code instructions of the computer program $1113_P$ are for example loaded into a RAM memory before being executed by the processing unit $1112_P$. The processing unit $1112_P$ implements the steps of the transport stream management method described previously, according to the instructions of the computer program $1113_P$. For this purpose, according to one embodiment, the processing unit $1112_P$ is configured for:
- obtaining at least one offset among:
  - at least one offset between an actual position of a current event packet in the transport stream, at the output of a broadcast network equipment, and a desired position of the current event packet in the transport stream (processing offset),
  - an offset determined according to a type of receiver intended to receive the transport stream (reception offset),
- the current event packet being associated with content carried by the transport stream, and carrying a synchronisation header comprising:
  - reference time information defined with respect to a reference clock of the content;
  - a desired delay between the current event packet and a reference packet of the content identified based on the reference time information,
- the desired position being determined based on reference time information and on said desired delay,
- transmitting, to at least one other item of equipment of the broadcast network, said at least one obtained offset, or a global offset determined based on at least one obtained offset.

A receiver according to one embodiment of the invention comprises a memory 1111R (comprising for example a buffer memory) and a processing unit 1112R (equipped for example with at least one processor, FPGA, or DSP), controlled or pre-programmed by an application or a computer program 1113R implementing the transport stream reception method according to one embodiment of the invention.

Upon initialisation, the code instructions of the computer program 1113R are for example loaded into a RAM memory before being executed by the processing unit 1112R. The processing unit 1112R implements the steps of the transport stream reception method described previously, according to the instructions of the computer program 1113R. For this purpose, according to one embodiment, the processing unit 1112R is configured for:
- receiving a transport stream carrying at least one current event packet associated with content carried by the transport stream, the current event packet carrying a synchronisation header comprising:
  - reference time information defined with respect to a reference clock of the content,
  - a desired or actual delay between the current event packet and a reference packet of the content identified based on the reference time information,
- synchronising an event carried by payload data of current event packet with a reference point the associated with the reference time information, taking into account a waiting delay determined from the synchronisation header of the current event packet.

The invention claimed is:

1. A method for monitoring a transport stream at the output of an equipment of a broadcast network, characterized in that said method implements at least one iteration of the following steps:
   obtaining the transport stream delivered by said equipment,
   detecting a current event packet associated with content carried by said transport stream, said event packet carrying a synchronization header comprising:
      reference time information defined with respect to a reference clock of said content,
      a desired delay between said current event packet and a reference packet of said content identified based on said reference time information,
   determining an offset between an actual position of said current event packet in said transport stream, and a desired position of said current event packet in said transport stream, determined based on said reference time information and on said desired delay, called processing offset.

2. The method according to claim 1, characterized in that it comprises a step of transmitting said processing offset to at least one other item of equipment of said broadcast network.

3. The method according to claim 1, characterized in that it comprises a step of updating said synchronization header with said processing offset.

4. The method according to claim 1, characterized in that it comprises a step of modifying the position of said current event packet in said transport stream taking into account said processing offset and a step of transmitting said modified transport stream.

5. The method according to claim 1, characterized in that said processing offset is an average offset obtained at the end of at least two iterations.

6. The method according to claim 1, characterized in that said reference time information corresponds to a restitution date of a reference picture of said content and in that said reference packet carries said reference picture.

7. The method according to claim 1, characterized in that said transport stream is in the MPEG-TS format, and in that said current event packet is a "Stream Event" in the DSM-CC format.

8. A non-transitory computer readable medium comprising a computer program comprising program code instructions for implementing a method according to claim 1, when said program is executed on a computer.

9. A method for inserting an event into a transport stream intended to be broadcast in a broadcast network, characterized in that it implements the following steps:
   obtaining said transport stream,
   inserting, in said transport stream, at least one current event packet associated with content carried by said transport stream, said current event packet carrying a synchronization header comprising:
      reference time information defined with respect to a reference clock of said content;
      a desired delay between said current event packet and a reference packet of said content identified based on said reference time information,
   said current event packet being inserted into said transport stream at a position defined from the position of said reference packet and said desired delay.

10. The method according to claim 9, characterized in that it implements at least one step of obtaining an offset between an actual position of said current event packet in said transport stream, at the output of an equipment of the broadcast network, and a desired position of said current event packet in said transport stream, determined based on said reference time information and on said desired delay, called processing offset.

11. The method according to claim 9, characterized in that it implements the reception of an offset determined according to a type of receiver intended to receive said transport stream, called reception delay.

12. The method according to claim 10, characterized in that it implements a step of modifying the position of said current event packet in said transport stream taking into account said processing offset according to claim 10.

13. The method according to claim 10, characterized in that it implements a step of inserting a subsequent event packet into said transport stream taking into account said processing offset according to claim 10.

14. A method for managing a transport stream broadcast in a broadcast network, characterized in that it implements the following steps:
   obtaining at least one offset among:
   at least one offset between an actual position of a current event packet in said transport stream, at the output of an equipment of the broadcast network, and a desired position of said current event packet in said transport stream, called processing offset,
   an offset determined according to a type of receiver intended to receive said transport stream, called reception offset,
   said current event packet being associated with content carried by said transport stream, and carrying a synchronization header comprising:
   reference time information defined with respect to a reference clock of said content;
   a desired delay between said current event packet and a reference packet of said content identified based on said reference time information,
   said desired position being determined based on said reference time information and on said desired delay,
   transmitting, to at least one other item of equipment of said broadcast network, said at least one obtained offset, or a global offset determined based on at least one obtained offset.

15. A method for receiving a transport stream broadcast in a broadcast network, characterized in that it implements the following steps:
   receiving a transport stream carrying at least one current event packet associated with content carried by said transport stream, said current event packet carrying a synchronization header comprising:
   reference time information defined with respect to a reference clock of said content,
   a desired or actual delay between said current event packet and a reference packet of said content identified based on said reference time information,
   synchronizing an event carried by payload data of said current event packet with a reference point associated with said reference time information, taking into account a waiting delay determined based on said synchronization header of said current event packet.

16. The method according to claim 15, characterized in that it comprises a step of obtaining an offset determined according to a type of receiver receiving said transport stream, called reception offset, and in that said waiting delay also takes into account said reception offset.

17. A device for monitoring a transport stream at the output of an equipment of a broadcast network, characterized in that it comprises a reprogrammable calculation machine or a dedicated calculation machine, configured for:
   obtaining the transport stream delivered by said equipment,
   detecting a current event packet associated with content carried by said transport stream, said event packet carrying a synchronization header comprising:
   reference time information defined with respect to a reference clock of said content;
   a desired delay between said current event packet and a reference packet of said content identified based on said reference time information,
   determining an offset between an actual position of said current event packet in said transport stream, and a desired position of said current event packet in said transport stream, determined based on said reference time information and on said desired delay, called processing offset.

18. A device for inserting an event into a transport stream intended to be broadcast in a broadcast network, characterized in that it comprises a reprogrammable calculation machine or a dedicated calculation machine, configured for:
   obtaining said transport stream,
   inserting, in said transport stream, at least one current event packet associated with content carried by said transport stream, said current event packet carrying a synchronization header comprising:
   reference time information defined with respect to a reference clock of said content;
   a desired delay between said current event packet and a reference packet of said content identified based on said reference time information,
   said current event packet being inserted into said transport stream at a position defined from the position of said reference packet and said desired delay.

19. A platform for managing a transport stream broadcast in a broadcast network, characterized in that it comprises a reprogrammable calculation machine or a dedicated calculation machine, configured for:
   obtaining at least one offset among:
   at least one offset between an actual position of a current event packet in said transport stream, at the output of an equipment of the broadcast network, and a desired position of said current event packet in said transport stream, called processing offset,
   an offset determined according to a type of receiver intended to receive said transport stream, called reception offset,
   said current event packet being associated with content carried by said transport stream, and carrying a synchronization header comprising:
   reference time information defined with respect to a reference clock of said content;
   a desired delay between said current event packet and a reference packet of said content identified based on said reference time information,
   said desired position being determined based on said reference time information and on said desired delay,
   transmitting, to at least one other item of equipment of said broadcast network, said at least one obtained offset, or a global offset determined based on at least one obtained offset.

20. A device for receiving a transport stream broadcast in a broadcast network, characterized in that it comprises a reprogrammable calculation machine or a dedicated calculation machine, configured for:
- receiving a transport stream carrying at least one current event packet associated with content carried by said transport stream, said current event packet carrying a synchronization header comprising:
- reference time information defined with respect to a reference clock of said content,
- a desired or actual delay between said current event packet and a reference packet of said content identified based on said reference time information,
- synchronizing an event carried by payload data of said current event packet with a reference point associated with said reference time information, taking into account a waiting delay determined based on said synchronization header of said current event packet.

* * * * *